(12) United States Patent
Ogawa et al.

(10) Patent No.: US 6,335,069 B1
(45) Date of Patent: *Jan. 1, 2002

(54) PHASE-CHANGEABLE OPTICAL RECORDING MEDIUM, METHOD OF MANUFACTURING THE SAME, AND METHOD OF RECORDING INFORMATION ON THE SAME

(75) Inventors: Shuichiro Ogawa; Isao Morimoto; Kazuhiro Nishimura; Masato Terada, all of Fuji (JP)

(73) Assignee: Asahi Kasei Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,192

(22) PCT Filed: Feb. 24, 1998

(86) PCT No.: PCT/JP98/00732

§ 371 Date: Aug. 26, 1999

§ 102(e) Date: Aug. 26, 1999

(87) PCT Pub. No.: WO98/38636

PCT Pub. Date: Sep. 3, 1998

(30) Foreign Application Priority Data

Feb. 28, 1997 (JP) .................................................. 9-046305
Nov. 19, 1997 (JP) .................................................. 9-318347

(51) Int. Cl.⁷ ...................................................... B32B 3/02
(52) U.S. Cl. ...................... 428/64.1; 428/64.4; 428/64.5; 428/64.6; 428/457; 428/913; 430/270.13; 430/495.1; 430/945; 369/283; 369/288
(58) Field of Search ................................ 428/64.1, 64.2, 428/64.4, 64.5, 64.6, 457, 913; 430/270.13, 495.1, 945; 369/283, 288

(56) References Cited

U.S. PATENT DOCUMENTS 5,431,978 A   7/1995   Nakamura et al. .......... 428/64.6

FOREIGN PATENT DOCUMENTS

| EP | 0 642 123 A1 | 3/1995 | ............. G11B/7/24 |
| JP | 62-53886 | 3/1987 | ............. B41M/5/26 |
| JP | 63-175242 | 7/1988 | ............. G11B/7/26 |
| JP | 06012670 | 1/1994 | ............. G11B/7/00 |
| JP | 07078354 | 3/1995 | ............. G11B/7/24 |
| JP | 07105574 A | 4/1995 | ............. G11B/7/24 |
| JP | 08063781 | 3/1996 | ............. G11B/7/24 |
| JP | 08197850 | 8/1996 | ............. B41M/5/26 |
| JP | 11-149665 | 6/1999 | ............. G11B/7/24 |

OTHER PUBLICATIONS

Tetsuya Nishida et al., "Single–Beam Overwrite Experiment Using In–Se Based Phase–Change Optical Media", pp. 667–669, Mar. 16, 1987, U.S.A.

Atushi Ogura et al., "Grain Growth Observation of <100> Textured Germanium Film By Transmission Electron Microscopy", pp. 16–18, Jan. 5, 1987, U.S.A.

Published by OHM Co., "Foundation Of Amorphous Semiconductor", pp. 20–25, May 25, 1982, Japan.

*Primary Examiner*—Elizabeth Evans
(74) *Attorney, Agent, or Firm*—Pennie & Edmonds LLP

(57) ABSTRACT

A phase change optical disk having a reflectance relation of Rc<Ra and is adapted such that high recording characteristic can be obtained starting at a first recording time even when a recording operation is carried out without conducting an initialization process. For this purpose, a multiple reflection layer (2), a first dielectric layer (3), a recording layer (4), a second dielectric layer (5), a reflecting layer (6) and an UV curable resin layer (7) are provided on a substrate (1). The recording layer (4) is deposited at a temperature of the substrate during the deposition of the recording layer set to a temperature which makes the recording layer into a stable amorphous conditions and which is lower than a crystallizing temperature of the recording layer. Thus, the recording layer (4) is deposited into a stable amorphous state.

2 Claims, 6 Drawing Sheets

PHASE-CHANGEABLE OPTICAL RECORDING MEDIUM, METHOD OF MANUFACTURING THE SAME, AND METHOD OF RECORDING INFORMATION ON THE SAME

TECHNICAL FIELD

The present invention concerns a phase change optical recording medium having a recording layer of changing phase between a crystalline state and an amorphous state in accordance with the intensity of an irradiation beam and, in particular, it relates to a phase change optical recording medium capable of making an initialization process unnecessary, a manufacturing method thereof and a recording method thereon.

BACKGROUND ART

In recent years, study and development have been made vigorously on optical information recording media as means for recording, reading and erasing an enormous amount of information. Particularly, so-called phase change optical disks conducting recording/erasing of information by utilizing reversible phase change of a recording layer between two crystalline and amorphous states have been considered promising since they have an advantage that new information can be recorded simultaneously while erasing old information (hereinafter referred to as "overwriting") by merely changing the power of a laser beam.

As the recording material for the phase change optical disk capable of overwriting, chalcogen alloys such as In—Se series alloys having low melting temperature and high absorption efficiency of laser beam (refer to Appl. Phys. Lett. Vol. 50, p 667, 1987) or In—Sb—Te (refer to Appl. Phys. Lett. Vol. 50, p 16, 1987) and Ge—Te—Sb alloy (refer to Japanese Patent Unexamined Publication Sho 62-53886) have been used mainly.

On the other hand, in a case of actually conducting recording/erasing by using the chalcogen alloys, a dielectric layer comprising at least one material selected from oxides, carbides, fluorides, sulfides and nitrides of metals or semimetals is usually disposed to either one or both of the surfaces of just beneath and just on the recording layer in order to prevent deformation of a substrate, oxidation of the recording layer, material migration along grooves or deformation of the recording layer due to heat upon recording/erasing.

Then, the phase change optical disk of a three layered or four layered structure having, on a transparent substrate, a recording layer comprising a chalcogen alloy, a dielectric layer disposed just beneath and/or just on the recording layer and a reflection layer also serving as a cooling layer (made of Al alloy or the like) disposed to the recording layer on the side opposite to the substrate is predominant, since this is desirable in view of recording/erasing characteristics.

In a usual phase change optical disk, the material of the recording layer is heated to a temperature higher than the melting point by irradiating a laser beam at a recording power to a recording layer and then quenched; so that the layer turned into an amorphous state with the result that a recording mark is formed. While the material of the recording layer is crystallized with the result that the recording mark is erased by irradiating a laser beam at an erasing power to heat the material to a temperature higher than the crystallizing temperature, followed by gradual cooling.

The phase change optical disk described above is manufactured by forming thin films constituting each of layers successively to a substrate, for example, by a sputtering method or a vapor deposition method. Since the recording layer just after the deposition is in the amorphous state, the disk is usually supplied after irradiating a laser beam to crystallize the entire surface. The process is generally called an initialization process.

The phase change optical disk of the three layered or four layered structure described above has a relation of Rc>Ra assuming the reflectivity when the recording layer is in a crystalline state as Rc and the reflectivity when the layer is in the amorphous state as Ra. The reflectivity when the recording layer is in the amorphous state is not a sufficient value for stable focusing and tracking by a usual driving apparatus. Then, a sufficient reflectivity can be obtained by turning the recording layer into the crystalline state by applying an initialization process.

However, the initialization process requires a time which it is about one minute and less than one minute in order to initialize the entire optical disk of 120 mm diameter even by a laser beam irradiation method which is most efficient, so the step is attributable to the increased cost in the manufacture of disks. That is, considering a time necessary for processing one optical disk in each of manufacturing steps for the optical disk (cycle time), the time required for the initialization process is longer compared with a step for molding a substrate or a step of depositing films. Accordingly, when the cycle time in the film deposition step is, for example, 8 sec, at least 6 to 7 sets of initialization apparatus which is extremely expensive are required in order to eliminate the time loss upon transfer to the initialization process. As a result, the manufacturing cost for the optical disks is increased by the application of the initialization process.

On the other hand, Japanese Patent Unexamined Publication Hei 7-78354 (EP 642123 A1) and Japanese Patent Unexamined Publication Hei 8-63781 disclose phase change optical disks in which a relation between the reflectivity (Rc) when the recording layer is in the crystalline state and the reflectivity (Ra) when the layer is an amorphous state is: Rc<Ra. Japanese Patent Unexamined Publication Hei 7-105574 discloses a phase change optical disk in which a relation between the light absorptivity (Ac) when the recording layer is in the crystalline state and the light absorptivity (Aa) when the layer is in the amorphous state is: Ac>Aa (that is: Rc<Ra).

Among them, Japanese Patent Unexamined Publication Hei 7-78354 and Hei 7-105574 describe that Rc<Ra or Ac>Aa can be attained by disposing a metal layer or a light absorption layer between a recording layer and a substrate. Further, Japanese Patent Unexamined Publication Hei 8-63781 describes that Rc<Ra can be attained by properly selecting the film thickness of a protection layer formed between a recording layer and a substrate.

Further, when setting the relation of the reflectivity as Rc<Ra, since the relation between the light absorptivity (Ac) when the recording layer is in the crystalline state and the light absorptivity (Aa) when the layer is in the amorphous state becomes Ac>Aa, distortion of the shape of an amorphous mark upon overwriting can be suppressed. This can decrease jitters contained in read light to obtain high recording/reading characteristic in mark edge recording capable of high density recording.

As described above, a sufficient reflectivity can be obtained even with no initialization process and high recording/reading characteristics can be obtained in the mark edge recording by a phase change optical disk with the relation of the reflectivity being Rc<Ra. However, it has been found by the study of the present inventors that when overwriting is conducted with no initialization process in this phase change optical disk, C/N (carrier to noise ratio) upon first recording is lower than C/N upon overwriting.

A subject of the present invention is to obtain high recording characteristic already from first recording even when recording is conducted without conducting the initialization process in a phase change optical disk with a relation of the reflectivity being Rc<Ra.

DISCLOSURE OF THE INVENTION

In order to solve the foregoing subject, the present invention provide a phase change optical recording medium having at least a substrate and a recording layer formed on one side thereof and changing phase between a crystalline state and an amorphous state in accordance with the intensity of an irradiation beam, and the reflectivity (of said medium) when the recording layer is in the crystalline state is made lower than the reflectivity when said layer in the amorphous state, wherein the recording layer is formed in a stable amorphous state for the entire surface at the time of this deposition.

That is, the phase change optical recording medium according to the present invention includes both of a rewritable phase change optical recording medium having a recording layer changing phase reversibly between a crystalline state and an amorphous state and a write-once phase change optical recording medium capable of recording only for once having a recording layer changing phase in at least one direction between a crystalline state and an amorphous state.

Figure 1:
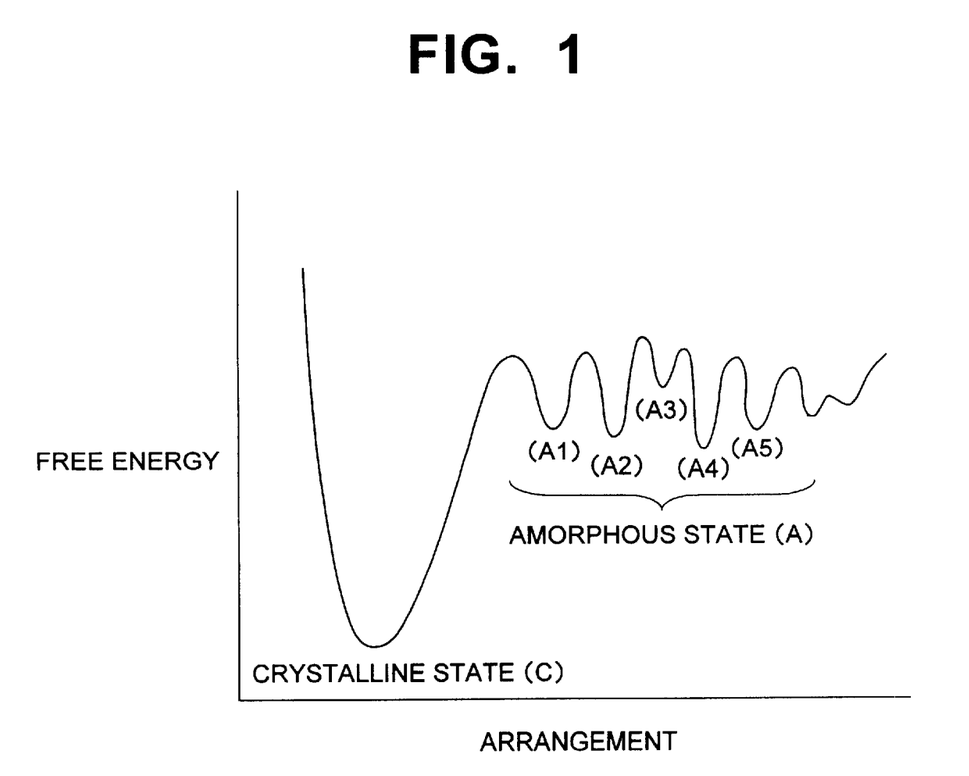
FIG. 1 is a graph showing a relation between the position of atoms and an energy in a thin film occurring phase change between crystalline and amorphous states.

Referring to the phase change between the crystalline state and the amorphous state, a graph shown in FIG. 1 is contained in "Foundation of Amorphous Semiconductor" (1982), p 23 published by OHM Co. The graph shows a relationship between the arrangement of atoms (degree of freedom) and a free energy in a thin film occurring phase change between the crystalline state and the amorphous state.

As can been seen from the figure, the free energy is minimized in a crystalline state (C) and a plurality of states where the free energy takes relatively shallow minimal values ($A_1$, $A_2$, $A_3$,- - - ) are present in an amorphous state (A). Then, it is considered that the thin film in each of the amorphous states can override a crest of an activation energy by a small energy applied from the outside in the form of heat and light and transfer to the state of other minimal value in adjacent therewith.

Among the amorphous states, an amorphous state ($A_1$) which is nearest to the crystalline state in view of the arrangement and can reach the crystalline state (C) by merely overriding one crest of the activation energy is defined as a stable amorphous state, while other amorphous states ($A_2$, $A_3$,- - - ) than the above are defined as quasi-stable amorphous states in the present invention. That is, upon transfer from the quasi-stable amorphous state ($A_2$, $A_3$, - - - ) to the crystalline state (C), it is necessary to override plural crests of activation energy. Therefore, a thin film in the quasi-stable amorphous state is difficult to turn into the crystalline state compared with the thin film in the stable amorphous state.

In an existent phase change optical recording medium with a relation of the reflectivity being Rc<Ra, since the temperature of the substrate is not controlled particularly upon deposition of each of the layers including the recording layer and it remains at a relatively low temperature (for example, the temperature is 20° C. or more and less than 35° C.), it is considered that the recording layer is in the quasi-stable amorphous state. That is, when recording is conducted without the initialization process, the first recording is conducted to the recording layer in the quasi-stable amorphous state. Therefore, a portion that should be crystallized is not crystallized sufficiently. Then, at or after the second recording in a case of the rewritable type, since the amorphous portion of the recording layer has been turned into the stable amorphous state before this recording by the first recording, the portion to be crystallized is sufficiently crystallized. As a result, this leads to a phenomenon that C/N upon recording is low in a case of the write-once type, and C/N upon first recording is lower than C/N upon overriding in a case of the rewritable type.

On the contrary, in the phase change optical recording medium of the present invention in which the relation of the reflectivity is: Rc<Ra, since the recording layer is formed in the stable amorphous state for the entire surface at the time of this deposition, first recording is conducted to the recording layer in the stable amorphous state even without conducting the initialization process. Accordingly, a portion that should be crystallized is sufficiently crystallized already from the first recording. As a result, high C/N is obtained in the recording in the case of the write-once type, while high C/N is obtained both in the first recording and at or after the second recording in the case of the rewritable type.

As described above, since the recording layer is deposited into the stable amorphous state in the phase change optical recording medium of the present invention, high C/N can be obtained already from the first recording if recording is conducted even without the initialization process. Therefore, the medium can be supplied without applying the initialization process and, as a result, it is possible to greatly improve the productivity and decrease the production cost.

Further, in the phase change optical recording medium according to the present invention, since it is no use to intentionally lower the high reflectivity (Ra) before recording to the low reflectivity Rc by the initialization process, it is preferred to conduct recording without previously crystallizing the entire surface (that is, without initialization process). Since this retains the high reflectivity before recording, inspection before supplying and various inspections after deposition of films can be applied stably.

Further, as a method of recording an the phase change optical recording medium of the present invention, if a method which the recording marks were made in the amorphous state and portions other than the recording marks were made in the crystalline state is employed, since this is the same recording method as that for the existent phase change optical recording medium supplied after applying the initialization process, it provides a merit that existent recording apparatus can be used as they are.

In addition, since the relation for the reflectivity is Rc<Ra in the phase change optical recording medium according to the present invention, if the non-data area (the region other than data region, such as an index area) is kept always in the amorphous state by making only the reading beam irradiate to the non-data region upon recording, the non-data area can be kept always at a high reflectivity.

The method of judging as to whether the deposited recording layer is in the stable amorphous state or in the quasi-stable amorphous state can include, for example, the following two methods.

The first method is a method of overwriting at an optimal power (both for the recording power and the erasing power), measuring a noise level (N1) after the first recording and a noise level (Nn) at or after the second recording (for example, second or tenth) and judging based on the difference between both of the measured values (N1 Nn). It can be judged that the deposited recording layer is in the stable amorphous state if an absolute value (N1–Nn) is within a predetermined value and that the layer is in the quasi-stable amorphous state if the absolute value is larger than the predetermined value. As the predetermined value, 6 dB or 3 dB can be mentioned for example.

The second method is method of measuring a temperature-reflectivity curve of the deposited recording layer by a DRS (Dynamic Reflectivity Spectroscopy) and judging based on the chart. The DRS method is a method of dynamically measuring change of the reflectivity while elevating the temperature of the film after deposition at a constant rate. According to this method, since the change of the reflectivity upon phase change from the amorphous state to the crystalline state can be measured usually, the temperature of crystallization and activation energy for crystallization can be recognized.

Since the optical constant is different between the amorphous state and the crystalline state even for recording layers of an identical composition, the reflectivity changes upon phase change from the amorphous state to the crystalline state. Further, since the optical constant usually differs somewhat also between the stable amorphous state and the quasi-stable amorphous state, change of reflectivity can often be measured also upon change from the quasi-stable amorphous state to the amorphous state.

Figure 2:
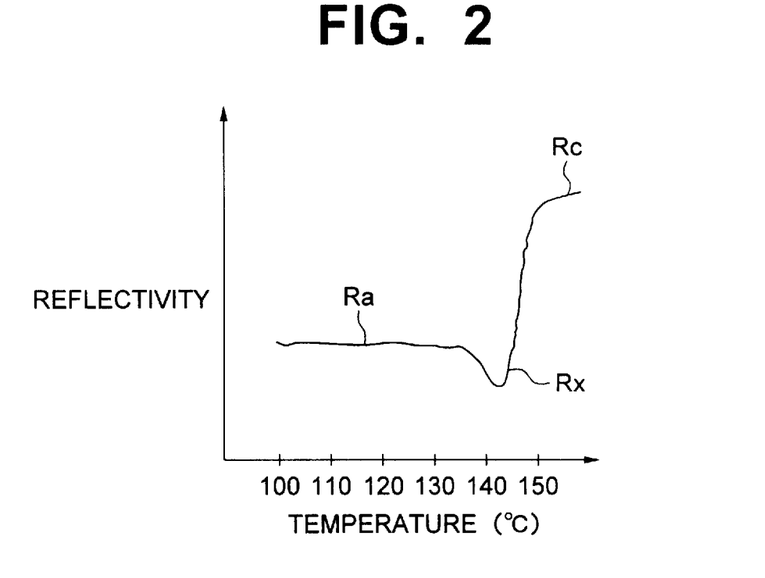
FIG. 2 is a graph showing a temperature-reflectivity curve when a recording layer of a certain composition is deposited in a quasi-stable amorphous state.
Figure 3:
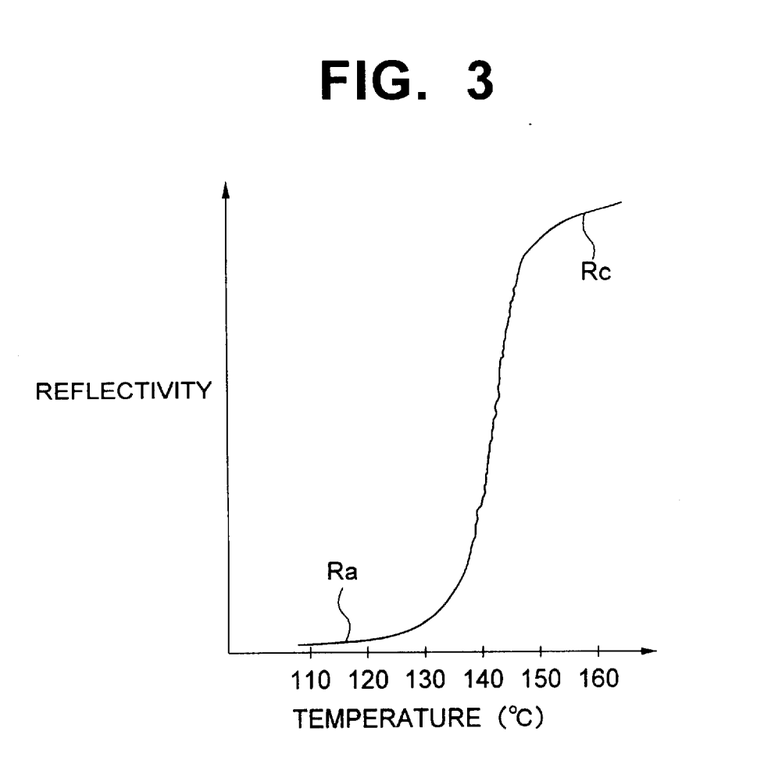
FIG. 3 is a graph showing a temperature-reflectivity curve when a recording layer of a composition identical with that in FIG. 2 is deposited in a stable amorphous state.

FIG. 2 shows a temperature-reflectivity curve when a recording layer of a composition is deposited in a quasi-stable amorphous state and FIG. 3 shows a temperature-reflectivity curve when a recording layer having the same composition is deposited in a stable amorphous state. Both of them are temperature-reflectivity curves obtained at an identical temperature elevation rate.

In FIG. 2, since the recording layer is deposited into the quasi-stable amorphous state, it does not directly changes from the reflectivity in the amorphous state (Ra) to the reflectivity (Rc) in the crystalline state, but there exists a temperature region that shows a reflectivity (RX) smaller than the reflectivity (Ra) in the amorphous state at a position slightly lower than the temperature at which the reflectivity changes to that in the crystalline state. It can be seen by the presence of the temperature region showing the reflectivity RX that the recording layer changes from the quasi-stable amorphous state by way of the stable amorphous state to the crystalline state if the layer is deposited to the quasi-stable amorphous state. However, depending on the composition of the recording layer or the film constitution as the recording medium, the temperature region showing the reflectivity RX may be extremely small and can not be determined easily. On the other hand, in FIG. 3, since the recording layer is deposited in the stable amorphous state, it changes from the reflectivity (Ra) in the amorphous state directly to the reflectivity (Rc) in the crystalline state in the vicinity of the crystallizing temperature.

Figure 4:
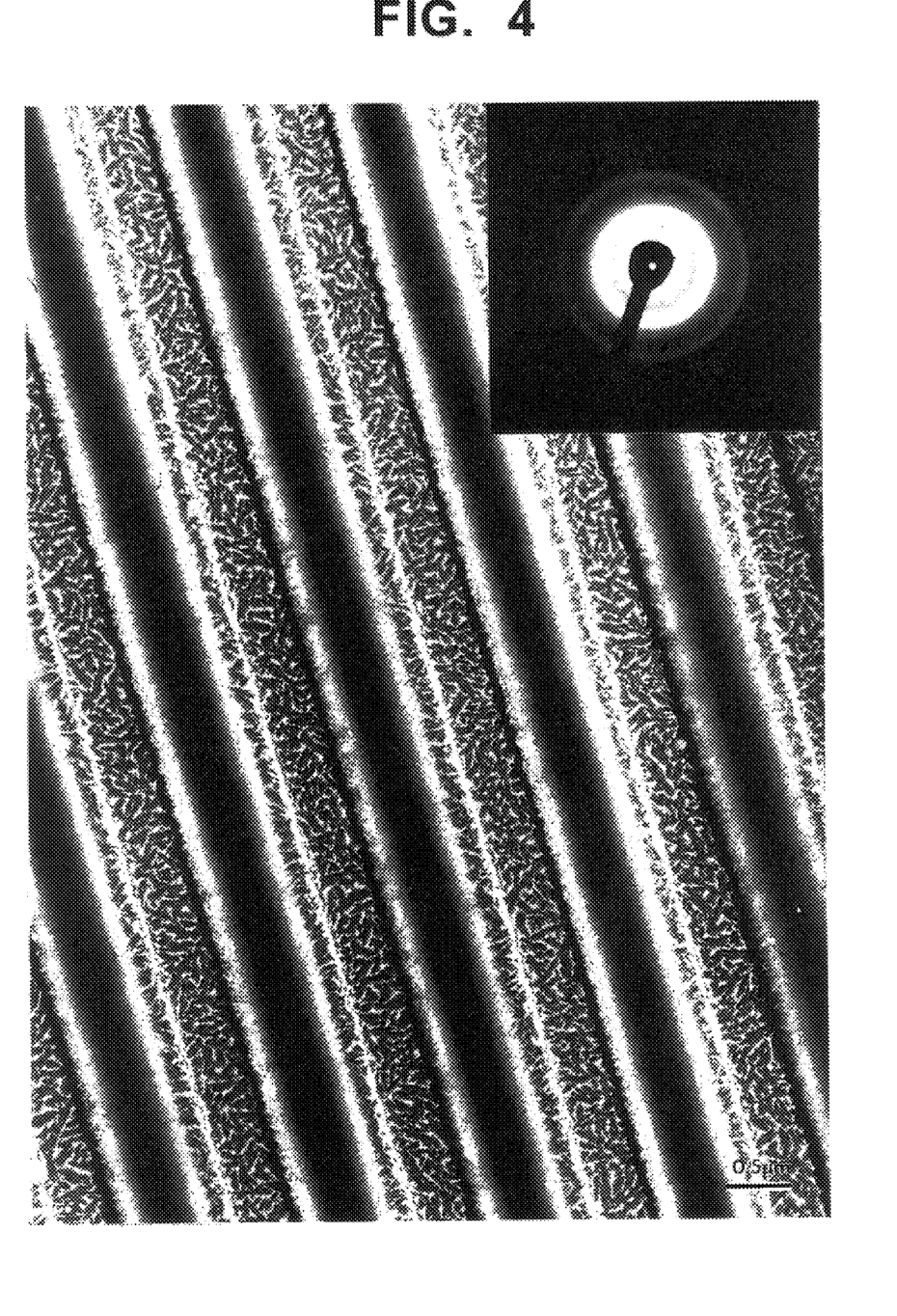
FIG. 4 is a TEM (Transmission Electron Microscope) photograph and a copied image of an electron beam diffraction pattern (in upper right portion) showing a thin film of $Ge_{32}Te_{68}$ partially applied with a treatment so as to form a stable amorphous state after deposition in an amorphous state.
Figure 5:
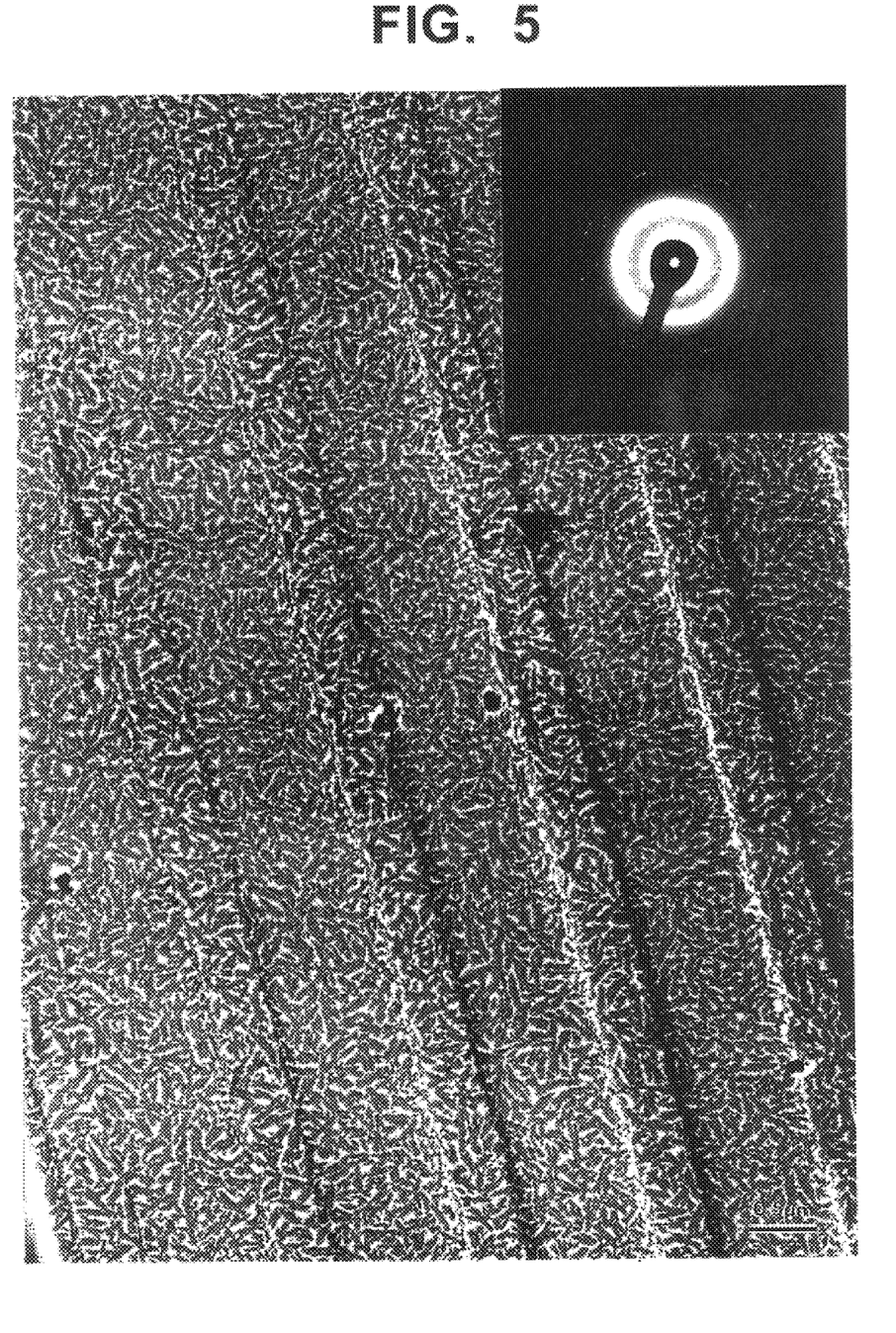
FIG. 5 is copied images of a TEM (Transmission Electron Microscope) photograph and an electron beam diffraction pattern (in upper right portion) showing a thin film of $Ge_{32}Te_{68}$ deposited in an amorphous state but not applied with a treatment so as to form a stable amorphous state.

FIG. 4 and FIG. 5 are copy images of TEM (Transmission Electron Microscopic) photographs and electron beam diffraction patterns (upper right portion) showing thin film of $Ge_{32}Te_{68}$ deposited in the amorphous state. The thin film shown in FIG. 4 is partially applied with a treatment to form a stable amorphous state but the thin film shown in FIG. 5 is not applied with such treatment.

That is, the thin film shown in FIG. 5 is the thin film of $Ge_{32}Te_{68}$ deposited on a substrate formed with grooves for guiding a laser beam without heating the substrate and it can be seen that the film is in the amorphous state based on the electron beam diffraction pattern. Further, since a fine structure is observed from the TEM photograph, it is considered that the thin film is deposited in the quasi-stable amorphous state.

The TEM photograph in FIG. 4 shows a state after irradiating a laser beam at 3 mW to a portion left to the groove (large width portion of stripe) of the thin film in FIG. 5 at an irradiation rate of 4 m/s. The electron ray diffraction pattern in FIG. 4 is a pattern for a laser irradiation portion and it can be seen from the pattern that the laser irradiated portion of the thin film in FIG. 4 is in an amorphous state. Further, it can be observed from the TEM photograph in FIG. 4 that the laser irradiation portion forms a portion without the fine structure (uniformly black portion) by the reflectivity being lowered, and it is considered that the laser irradiation portion changes from the quasi-stable amorphous state to the amorphous state. It can be seen from the photographs that different two states (stable amorphous state and quasi-stable amorphous state) are actually present in thin films of an identical composition in the amorphous state. However, the two different states described above can not be clearly distinguished so often.

The method of depositing the recording layer so as to form the stable amorphous state can include (1) a method of controlling the temperature of the underlying portion on which the layer is deposited immediately before, immediately after or during deposition of the recording layer to a temperature which makes the recording layer into the stable amorphous state and which is lower than the crystallizing temperature of the recording layer, (2) a method of depositing the recording layer by a laser abrasion method and (3) a method of depositing a film by a sputtering method using helium or neon as a sputtering gas or using a gas mixture containing helium or neon in argon.

The method (1) includes ① a method of heating a substrate or the underlying surface immediately before deposition of the recording layer thereby previously elevating the temperature of the underlying portion for the recording layer, ② a method of starting heating for the substrate or the underlying surface immediately after starting the deposition of the recording layer and continuing the heating during deposition to keep a high temperature for the underlying portion of the recording layer, ③ a method of heating the substrate or the deposited surface immediately after the completion of the deposition for the recording layer and ④ a method of starting the deposition of the recording layer immediately after the completion of the film deposition taken place just before, utilizing the heat generated by the deposition conducted before the deposition of the recording layer and accumulated in the substrate. The heating method can include a method of irradiating a light including heat rays to the deposited surface of the substrate (underlying portion for the recording layer), a method of heating the substrate holder itself by a heater or the like, heating by radio frequency induction, heating by flash exposure and by plasma treatment.

When the method (1) is adopted in a case where the recording layer comprises a Ge-Te-Sb series alloy and the substrate is made of glass, it is preferred that the substrate temperature during deposition of the recording layer is from 35° C. to 150° C. That is, the Ge-Te-Sb series alloy forms a stable amorphous state if the deposition temperature is 35° C. or higher and causes crystallization if it exceeds 150° C. A substrate temperature of 45° C. or higher during deposition of the recording layer is preferred since the noise reducing effect in the first recording is remarkably improved. More preferably, it is 55° C. or higher. If the substrate is made of a plastic (for example, polycarbonate), it is preferred to control the substrate temperature to 110° C. or lower and, more preferably, to 95° C. or lower during deposition of the recording layer in order not to cause deformation in the plastic substrate.

Figure 6:
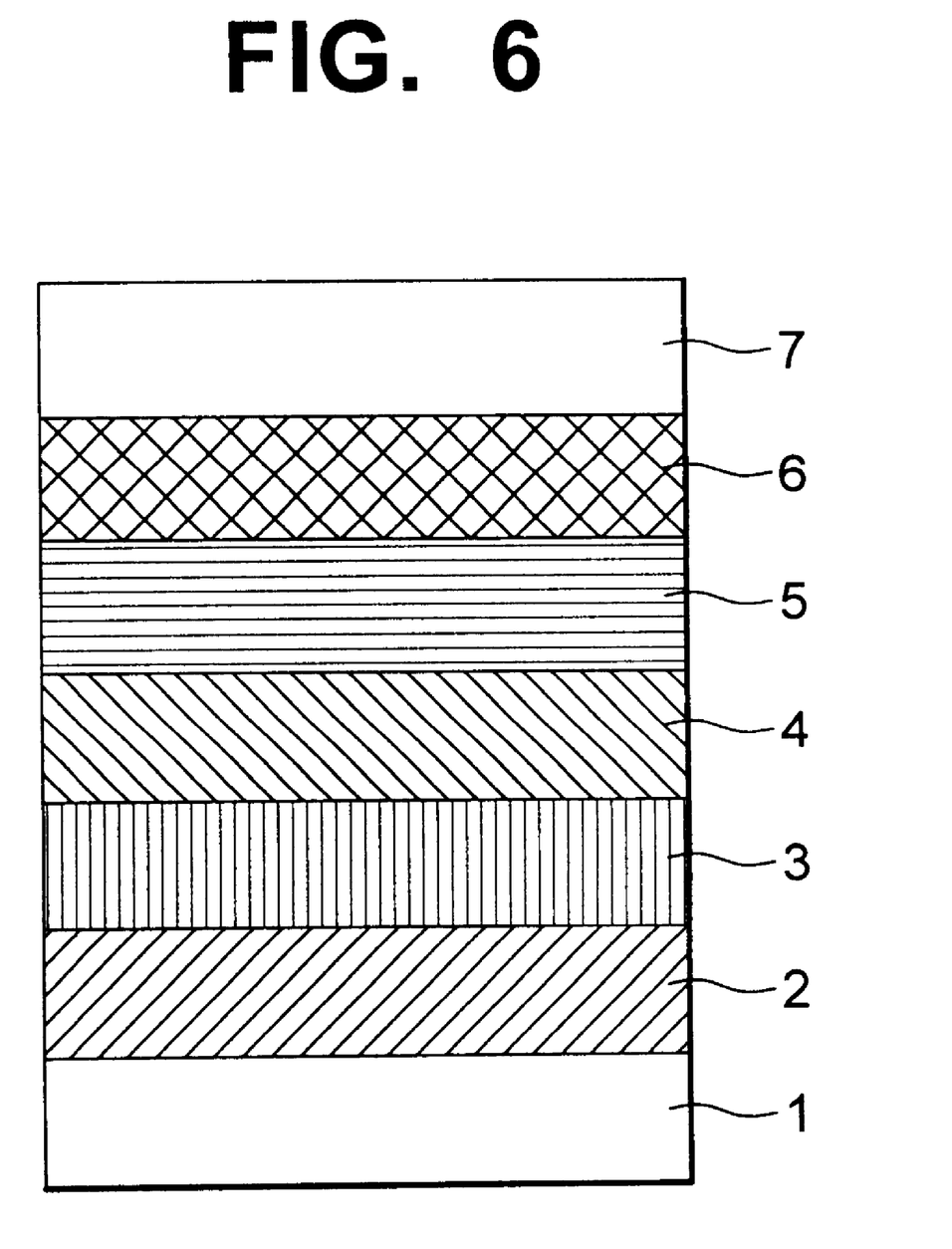
FIG. 6 is a cross sectional view showing a layered structure of a phase change optical recording medium corresponding to one embodiment of the present invention.

The layered structure for the phase change optical recording medium with the relation of the reflectivity being Rc<Ra can include a constitution, for example, shown in FIG. 6, which comprises, on a substrate 1, a multiple reflection layer 2, a first dielectric layer 3, a recording layer 4, a second dielectric layer 5 and a reflection layer 6 in this order. In FIG. 6, reference numeral 7 denotes an UV-curable resin layer for protecting the surface of the thin film. The multiple reflection layer 2 is a layer for causing multiple reflection of an incident beam between itself and the recording layer 4, and the relation: Rc<Ra is attained by the presence of the multiple reflection layer 2 within a certain range of a film thickness for the first dielectric layer 3.

The multiple reflection layer 2 can include, for example, a light absorption layer comprising a metal, a semi-metal or a semiconductor, a dielectric multi-layered film formed by alternately laminating or a dielectric material of high refractive index and a dielectric material at low refractivity. The light absorption layer can include, concretely, a layer made of an element comprising Al, Ti, Cr, Ni, Cu, Si, Ge, Ag, Au, Pd, Ga, Se, In, Sn, Sb, Te, Pb, Bi or Ta, or an alloy containing elements selected from the group.

The layered constitution having the dielectric multi-layered film as the multiple reflection layer 2 is preferred since the relation is Rc<Ra and an optical contrast is also high. The dielectric material of high refractive index in this case is preferably oxides such as $TiO_2$, $CeO_2$ and $ZrO_2$, sulfides such as $Sb_2S_3$, CdS and ZnS and nitrides such as $Si_3N_4$ and TiN. The dielectric material of low refractive index is preferably, fluorides such as $MgF_2$ and $CeF_3$ and oxides such as $SiO_2$ and $Al_2O_3$.

For the first and the second dielectric layers 3 and 5, those materials having high heat resistance and a melting point of 1000° C. or higher, for example, $SiO_2$, a mixture of ZnS and $SiO_2$, $Al_2O_3$, AlN and $Si_3N_4$ are used. Among all, the mixture of ZnS and $SiO_2$ is preferred.

As described previously, since the relation of the reflectivity of the phase change optical recording medium is Rc<Ra when the multiple reflection layer 2 is disposed and the thickness of the first dielectric layer 3 is within a certain range, the film thickness of the first dielectric layer 3 is defined within a range as capable of providing the relation of the reflectivity: Rc<Ra in accordance with the entire film constitution.

The film thickness of the second dielectric layer 5 has to be set in view of the recording velocity, the reading velocity and the like. That is, when the linear recording velocity is relatively low, for example, as 6 m/s, the film thickness of the second dielectric layer 5 is preferably made relatively thin to form a phase change optical recording medium of "rapidly cooled structure" and, specifically, it is preferably from 50 Å to 500 Å. If it is less than 50 Å, no sufficient recording sensitivity is obtained and, if it is exceeds 500 Å, no sufficient overwrite cyclability can be obtained.

However, in a phase change optical recording medium of "gradually cooled structure" in which the film thickness of the velocity dielectric layer 5 is relatively thick, the recording speed can be increased since the recording sensitivity is high. Accordingly, the film thickness of the second dielectric layer 5 may be larger than 500 Å, but it is preferably 3000 Å or less even for the "gradually cooled structure" since generally the read beam is deteriorated incredibly in the case of the thickness being larger than 3000Å.

It has been confirmed by the experiment of the present inventors that if the method (1) is adopted as the method of depositing the recording layer so as to form the stable amorphous state, hydrogen is contained in the first and the second dielectric layers 3 and 5 deposited before and after the recording layer even when a hydrogen gas is not contained in an atmospheric gas during film deposition.

As the material of the recording layer 4, Ge—Te—Sb series alloys and Ge—Te—Sb—Bi series alloys are used preferably. Further, the alloys described above may be incorporated, for example, with hydrogen, nitrogen, oxygen, carbon, Al, Ti, Fe, Co, Ni, Cu, Zn, Ga, Se, Sn, In, Ag, Pd, Rh, Ru, Mo, Nb, Hf. Zr, Ta, W, Re, Os, Ir, Pt, Au, Tl or Pb. The elements described above may be incorporated during deposition of the recording layer from a target or by addition in a gaseous state into the atmospheric gas.

The film thickness of the recording layer 4 is desirably from 50 Å to 1000 Å. No sufficient recording sensitivity can be obtained if it is less than 50 Å, whereas thickness in excess of 1000 Å is not preferred since this gives rise to a problem in view of the recording sensitivity and the resolution.

As the reflection layer 6 used in the phase-change type recording medium of the constitution described above, a metal, semi-metal or semiconductor is used generally. The film thickness of the reflection layer 6 is preferably 300 Å or more.

The method of forming each of the layers can include, vapor deposition method, a sputtering method and an ion lating method.

BEST MODE FOR PRACTICING THE INVENTION

Now, preferred embodiments of the present invention are to be explained referring to concrete examples and comparative examples.

EXAMPLE 1

A phase change optical disk of a layer structure shown in FIG. 6 was manufactured as described below.

At first, on a polycarbonate substrate 1 of 120 mm diameter and 0.6 mm thickness having grooves for a laser beam, were deposited a light absorption layer 2 made of Au to a film thickness of 10 nm, a first dielectric layer 3 comprising a mixture of ZnS and $SiO_2$ (the existent ratio of $SiO_2$: 12 mol %) to a film thickness of 110 nm, a recording layer 4 comprising Ge, Te and Sb to a film thickness of 11 nm, a second dielectric layer 5 comprising the same material as the first dielectric layer 3 to a film thickness of 37 nm and a reflection layer 6 comprising Al—Ti (Ti existent ratio: 2 atom %) to a film thickness of 70 nm successively by a sputtering method. An Ar gas was used as a sputtering gas.

Then, after completing the deposition of the first dielectric layer 3, light from halogen lamps (two lamps, each 500 W) was irradiated to the surface of the first dielectric layer 3. The irradiation was conducted at a charged voltage of a 45 V and for 5 min. Immediately after the light irradiation, the film of the recording layer 4 was deposited. The substrate temperature immediately before starting the deposition of the recording layer 4 was 75° C. The substrate temperature immediately after the completion of the deposition of the recording layer 4 was 35° C. or higher.

Then, an UV-curable resin was coated by a spin coat method on the reflection layer 6 and cured so as to laminate an UV curable resin 7.

The recording layer of the thus obtained optical disk was in an amorphous state and the disk had a reflectivity at a wavelength of 680 nm of 16.9%. Further, in the case where the recording layer of the optical disk was in the crystalline state, the reflectivity was 4.3%.

EXAMPLE 2

The condition for the light irradiation to the surface of the first dielectric layer 3 was changed to the charged voltage at 35 V and the irradiation time for 5 min, to make the substrate temperature immediately before starting the deposition of the recording layer 55° C. The substrate temperature immediately after the completion of the deposition of the recording layer 4 was 35° C. or higher. A phase change optical disk of a layered structure shown in FIG. 6 was manufactured quite in the same manner as in Example 1 except for those described above.

The recording layer of the thus obtained optical disk was in an amorphous state and the disk had a reflectivity at a wavelength of 680 nm of 16.5%. Further, in the case where the recording layer of the optical disk was in the crystalline state, the reflectivity was 4.5%.

EXAMPLE 3

The condition for the light irradiation to the surface of the first dielectric layer 3 was changed to the charged voltage at 25 V and the irradiation time for 5 min to make the substrate temperature immediately before starting the deposition of the recording layer 4 40° C. The substrate temperature immediately after the completion of the position of the recording layer 4 was 35° C. or higher. A phase change optical disk of a layered structure shown in FIG. 6 was manufactured quite in the same manner as in Example 1 except for those described above.

The recording layer of the thus obtained optical disk was in an amorphous state and the disk had a reflectivity at a wavelength of 680 nm of 16.2%. Further, in the case where the recording layer of the optical disk was in the crystalline state, the reflectivity was 4.8%.

EXAMPLE 4

Since the substrate temperature upon completing the deposition of the first dielectric layer 3 was 45° C., the deposition of the recording layer 4 was started immediately after the completion of the deposition (within five sec) of the first dielectric layer 3, to make the substrate temperature immediately before starting the deposition of the recording layer 42° C. The substrate temperature immediately after the completion of the decomposition of the recording layer 4 was 35° C. or higher. A phase change optical disk of a layered structure shown in FIG. 6 was manufactured quite in the same manner as in Example 1 except for those described above.

The recording layer of the thus obtained optical disk was in an amorphous state and the disk had a reflectivity at a wavelength of 680 nm of 16.4%. Further, in the case where the recording layer of the optical disk was in the crystalline state, the reflectivity was 4.5%.

COMPARATIVE EXAMPLE 1

The substrate temperature upon completing deposition of the first dielectric layer 3 was 45° C., but the deposition of the recording layer 4 was started after 300 sec or more from completing the film deposition of the first dielectric layer 3 to make the substrate temperature immediately before starting the deposition of the recording layer 4 33° C. The substrate temperature immediately after the completion of the deposition of the recording layer 4 was lower than 33° C. A phase change optical disk of the layered structure shown in FIG. 6 was manufactured quite in the same manner as in Example 1 except for those described above.

The recording layer of the thus obtained optical disk was in an amorphous state and the disk had a reflectivity at a wavelength of 680 nm of 17.3%. Further, in the case where the recording layer of the optical disk in the crystalline state, the reflectivity was 5.2%.

Figure 7:
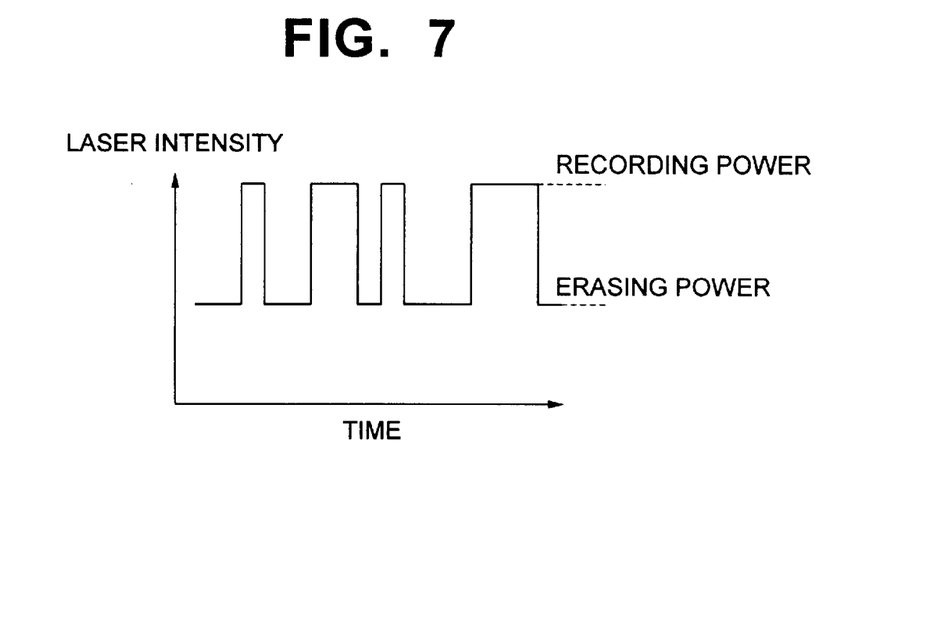
FIG. 7 is a graph shows an intensity modulated waveform of a laser beam used for recording in Examples 1 to 4.

Each of the thus manufactured optical disks in Examples 1 to 4 and Comparative Example 1 was placed to a driving apparatus, as it was with no initialization. Then, the disk was rotated at 1800 rpm, and a laser beam (the wavelength was 680 nm) being modulated at 12 mW of recording power and 5 mW of erasing power as shown in FIG. 7 was irradiated to a position of 26 mm from the center of the disk; so that a signal of a frequency of 5 MHz was recorded.

Further, after the identical signal was overwritten at the same position, C/N and noise levels were measured for first recording, second recording, third recording, fifth recording and tenth recording. The results (dB) for the measurement of C/N are shown in Table 1 and the results for measurement of the noise level (dB) are shown in Table 2.

TABLE 1

|  | First | Second | Third | Fifth | Tenth |
|---|---|---|---|---|---|
| Example 1 | 54.6 | 55.4 | 56.0 | 56.3 | 56.6 |
| Example 2 | 55.0 | 56.2 | 56.7 | 57.0 | 56.7 |
| Example 3 | 56.1 | 55.6 | 56.1 | 56.2 | 56.2 |
| Example 4 | 52.6 | 55.5 | 53.4 | 56.2 | 56.2 |
| Comp. Example1 | 46.0 | 53.9 | 53.4 | 54.6 | 54.2 |

TABLE 2

|  | First | Second | Third | Fifth | Tenth |
|---|---|---|---|---|---|
| Example 1 | −79.8 | −80.0 | −80.3 | −80.3 | −80.5 |
| Example 2 | −79.6 | −80.0 | −80.3 | −80.4 | −80.2 |
| Example 3 | −74.1 | −79.1 | −79.3 | −79.5 | −79.6 |
| Example 4 | −77.5 | −80.1 | −80.3 | −80.4 | −80.6 |
| Comp. Example 1 | −71.9 | −79.3 | −79.6 | −79.9 | −80.2 |

As can be seen from the results, in comparative Example 1, the noise level at the first recording is rather larger than that at and after the second recording and, correspondingly, C/N at the first recording is rather lower than that at and after the second recording. In Examples 1–4 differences between the first recording and at and after the second recording are smaller for both the noise level and C/N than those in Comparative Example 1. With respect to comparison in Examples 1–4, the difference between the first recording and at and after the second recording is smaller, as the substrate temperature immediately before the deposition of the recording layer is higher.

Therefore, when recording is conducted even without initialization process to a phase change optical disk with the relation of the reflectivity being Rc<Ra, if the optical disk is manufactured by elevating the substrate temperature immediately before the deposition of the recording layer within a range lower than the temperature at which the substrate is not deformed, high recording characteristic can be obtained already from the first recording. Particularly, this effect is higher in Examples 1 and 2 in which the substrate temperature immediately before deposition of the recording layer is at 55° C. and 75° C.

EXAMPLE 5

A sample disk identical with that in Example 1 was manufactured except for forming a concave-convex shape index portion showing a data control information (region other than date region) within grooves of the substrate previously. The disk sample was placed to a driving apparatus, as it was with no initializing processing. Then the sample was rotated at 1800 rpm, and a mark edge recording using 1–7 modulation signals was conducted by a laser beam at a wavelength of 680 nm to a 24 mm radial position from the center of the sample.

Figure 8:
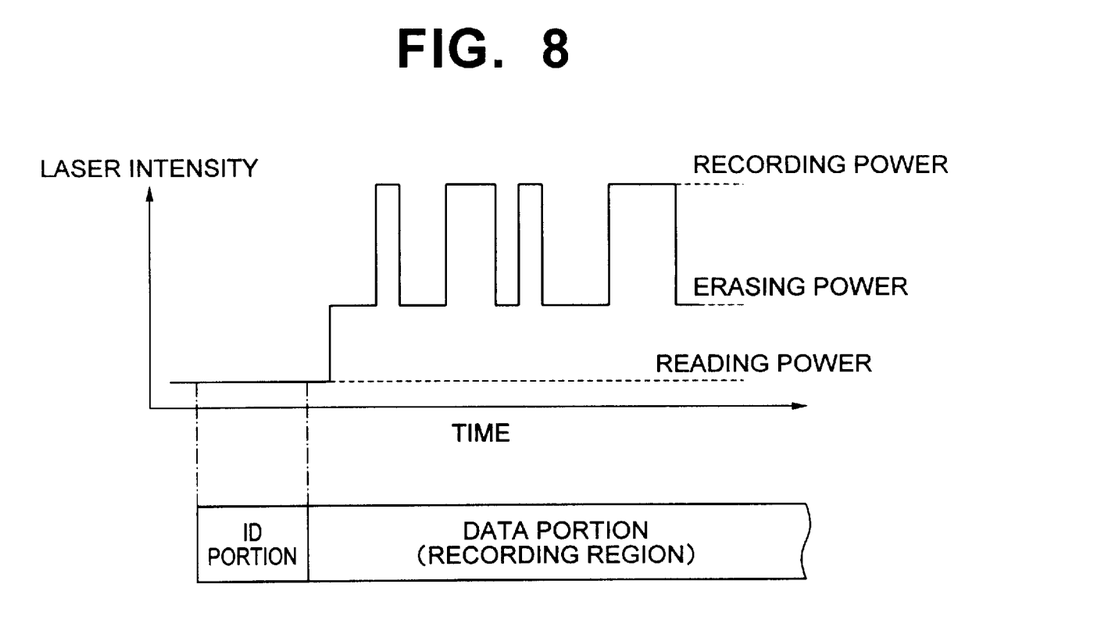
FIG. 8 is a schematic view illustrating the relation of an intensity modulated waveform (a) of a laser beam used for recording in Example 5 and an index portion and a data recording portion of a recording track (b).

The recording was conducted by irradiating an intensity modulated laser beam between each of the recording power, the erasing power and the reading power as shown in FIG. 8(a). In this case as shown in FIG. 8(b), only the laser light at a low intensity corresponding to the reading power was irradiated to the index portion, and the reading power was also set to such a value that the index portion can be kept in an amorphous state. In this experiment, the recording power was 11 mW, the erasing power was 4.5 mW and the reading power was 1.0 mW. The recording pattern was a random pattern having a bit length of 0.45 μm per one bit (shortest mark length: 0.6 μm). Then, a random pattern different from the above was overwritten on the identical track.

After the first recording and the overwriting, the recorded track was read by the reading power and jitter (deviation in the direction of the time axis) contained in the readout signal was measured. The jitter value was determined by at first analyzing the readout signal by a jitter analyzer to obtain a standard deviation σ of the jitters and then calculating the ratio (σ/Tw) of the standard deviation σ relative to Tw (window width). As a result, the jitter value after the first recording was 5% and the jitter value after the overwriting was 7%. Further when the index signals were read, they could be read with no error.

COMPARATIVE EXAMPLE 2

An initialization process was at first applied to a disk sample manufactured quite in the same manner as in Example 5. That is, while rotating the disk, a semiconductor laser beam irradiated to the disk from the side of the substrate to make the recording layer into a crystalline state. The beam had 1 μm width and 10 μm length and was arranged such that the longitudinal direction was perpendicular to the track of the disk. The time required for the initialization was about 3 min. Recording and reading characteristics were measured for the disk sample applied with the initialization in the same method as in Example 5.

The jitter value after the first recording and the overwriting was satisfactory as about 7%, but errors occurred frequently when index signals were read. When the amplitude of the index signals was measured, it was only about 17% of the amplitude of the index signals in Example 5. Further, during experiment for the first recording, defocusing and out-of-tracking occurred frequently.

As described above, in a case of applying the initializing treatment as in the prior art, an initializing apparatus for exclusive use is necessary and it required a processing time for 3 min per one side and 6 min for both sides. Further, since the recording layer is made into the crystalline state by the initializing treatment, the reflectivity is lowered excessively to bring about a disadvantage such as frequent occurrence of reading errors for the index signals and defocusing or out-of-tracking during recording.

INDUSTRIAL APPLICABILITY

As has been described above, the phase change optical recording medium according to the present invention is a phase change optical recording medium with a relation of reflectivity being Rc<Ra, capable of obtaining a sufficient reflectivity even if the recording layer is in the amorphous state and obtaining high recording-reading characteristics in mark edge recording, and high recording characteristic can be obtained already from the first time recording even if recording is conducted with no initialization process. Accordingly, the phase change optical recording medium of the present invention can save the initialization process while ensuring the recording reliability. Further, according to the manufacturing method of the present invention, the phase change optical recording medium described above can be obtained easily. Further, the recording method according to the present invention can conduct recording while fully taking advantages of the characteristics of the phase change optical recording medium according to the present invention.

What is claimed is:

1. A method of manufacturing a phase change optical recording medium having at least a substrate and a recording layer formed on one side thereof and changing phase between a crystalline state and an amorphous state depending on the intensity of an irradiation beam, wherein the reflectivity of said medium when the recording layer is in the crystalline state is made lower than the reflectivity when said layer is in the amorphous state, wherein the recording layer is deposited as to be in a stable amorphous state, and wherein the substrate temperature during deposition of the recording layer is from about 35° C. to about 150° C.

2. A method of manufacturing a phase change optical recording medium having at least a substrate and a recording layer formed on one side thereof and changing phase between a crystalline state and an amorphous state depending on the intensity of an irradiation beam, wherein the reflectivity of said medium when the recording layer is in the crystalline state is made lower than the reflectivity when said layer is in the amorphous state, wherein the recording layer is deposited as to be in a stable amorphous state, and wherein the substrate temperature immediately before deposition of the recording layer is from about 35° C. to about 95° C.

* * * * *